United States Patent
Tung

(10) Patent No.: US 6,500,309 B1
(45) Date of Patent: Dec. 31, 2002

(54) DIMENSIONS IN REACTIVE DISTILLATION TECHNOLOGY

(76) Inventor: Peter Tung, 63 Templer Dr., Ancaster, Ontario (CA), L9G 3X7

(*) Notice: Subject to any disclaimer, the term of this patent is extended or adjusted under 35 U.S.C. 154(b) by 0 days.

(21) Appl. No.: 09/460,187

(22) Filed: Dec. 11, 1999

(51) Int. Cl.[7] ............... B01D 3/14; B01J 8/00
(52) U.S. Cl. ............ 202/153; 202/158; 203/29; 203/DIG. 6; 422/213
(58) Field of Search ............ 203/28, 29, DIG. 6, 203/98, 100; 202/153, 158; 422/213, 211; 208/350; 261/114.5, 146; 585/800, 805

(56) References Cited

U.S. PATENT DOCUMENTS

| | | | |
|---|---|---|---|
| 2,555,606 A | * 6/1951 | Potts | 202/154 |
| 4,194,964 A | 3/1980 | Chen et al. | 708/108 |
| 5,086,193 A | 2/1992 | Sy | 585/446 |
| 5,113,031 A | 5/1992 | Sy | 585/447 |
| 5,118,873 A | 6/1992 | Smith | 568/697 |
| 5,215,725 A | 6/1993 | Sy | 422/212 |
| 5,308,592 A | * 5/1994 | Yang et al. | 422/191 |
| 5,321,163 A | 6/1994 | Hickey et al. | 568/59 |
| 5,431,888 A | 7/1995 | Hickey et al. | 422/191 |
| 5,476,978 A | 12/1995 | Smith et al. | 585/323 |
| 5,597,476 A | 1/1997 | Hearns et al. | 208/208 R |
| 5,675,054 A | * 10/1997 | Manley et al. | 585/809 |
| 5,679,241 A | 10/1997 | Stanley et al. | 208/92 |
| 5,837,130 A | 11/1998 | Crossland | 208/213 |
| 5,866,736 A | 2/1999 | Chen | 585/323 |
| 5,905,178 A | * 5/1999 | Hildreth | 585/258 |
| 5,925,688 A | 7/1999 | Adams et al. | 518/700 |
| 5,925,799 A | 7/1999 | Stanley et al. | 585/259 |
| 5,961,815 A | 10/1999 | Hickey et al. | 208/108 |
| 6,084,141 A | * 7/2000 | Mikitenko et al. | 585/263 |
| 6,242,662 B1 | * 6/2001 | Dorbon et al. | 585/670 |

OTHER PUBLICATIONS

Chemical Engineering, Jul. 1997 p. 78–84 "Catalytic Distillation Extends It's Reach" Rock, Gildert Mc Guirk.

* cited by examiner

Primary Examiner—Virginia Manoharan

(57) ABSTRACT

A system for separating products from reactants within a reactive distillation column is revealed. Reaction products heavier than reactants are discouraged to re-enter the reaction zone by a rectifying section in between the reaction zone and the stripping section. Reaction products lighter than reactants are discouraged to re-enter the reaction zone by a stripping section in between the reaction zone and the rectifying section.

13 Claims, 3 Drawing Sheets

RECTIFYING SECTION
STRIPPING SECTION

DIMENSIONS IN REACTIVE DISTILLATION TECHNOLOGY

BACKGROUND

1. Field of Invention

This invention relates to reactive distillation, specifically to improvements in reaction selectivity and conversion, resulting in reduced catalyst volume and capital costs requirement.

2. Discussion of Prior Art

Combining chemical reaction and distillation in one unit operation has found wider acceptance despite intrinsic difficulty in pressure drop across reaction zone. U.S. Pat. No. 4,242,530 for example, taught the method of bundling catalysts in steel wire mesh to form bales, which are then placed inside a distillation column as reactive packing materials. These bales and other currently available reactive distillation packing structural arrangements are all designed to provide free paths for liquid/vapor counter current flow within the reaction zone.

Two major drawbacks come with all existing arrangements:

1) Because of the free paths, both reactants and products can move freely into the reaction catalyst area or remain in the vapor/liquid main stream bulk area, resulting in higher residence time and lower reaction selectivity since desirable product(s) has more time to be converted to undesirable by-products.

2) Part of the product(s) leaving the reaction zone re-enters the reaction zone; either via vapor entering from the stripping zone below the reaction zone; or via liquid entering from the rectification zone above the reaction zone. Such undesirable product movements cannot be prevented because composition profile of any component, including reaction product(s), is continuous and approaches thermodynamic equilibrium within the column. Special catalyst arrangements and internals such as structured packing would further increase capital and maintenance costs, reducing competitiveness.

OBJECTS AND ADVANTAGES

Accordingly, several objects and advantages of my invention are: This invention focuses on discouraging product re-entry into the reaction zone by positively separating the products from the reactants as soon as the product leaves the reaction zone. This allows desired reaction to proceed with higher degree of selectivity. The following two factors enable this enhancement: Firstly, the rate of products re-entering the reaction zone can be manipulated and optimized, discouraging secondary reactions, generating less by-products. Secondly, the reduced rate of products re-entering the reaction zone lowers product concentration throughout the reaction zone. Equilibrium reaction is encouraged to proceed forward, converting reactants to desirable products faster. Fewer side reactions and faster desirable reaction rate would require less reactor bed volume for a targeted conversion. With shortened residence time requirement, benefits like much shorter bed height amongst others will result. The above revelations open up yet another dimension in the field of reactive distillation.

Reactive distillation can begin accommodating chemical reactions that have previously been precluded due to multiple competing side reactions. Avoiding those side reactions no longer means purposely lowering reaction temperature and suffering low reaction rate. Further objects and advantages of my invention will become apparent from a consideration of drawings and ensuing description.

SUMMARY

The summary of my invention is a system designed to separate reaction products from reactants within a reactive distillation column by providing rectification and/or stripping capabilities below and/or above the reaction zone, respectively, to reduce the amount of reaction products re-entering the reaction zone. Such reaction zone enhancement could shorten reactor bed height while enabling reactive distillation to tackle multiple side reaction processes.

DESCRIPTION OF INVENTION

Figure 1B:
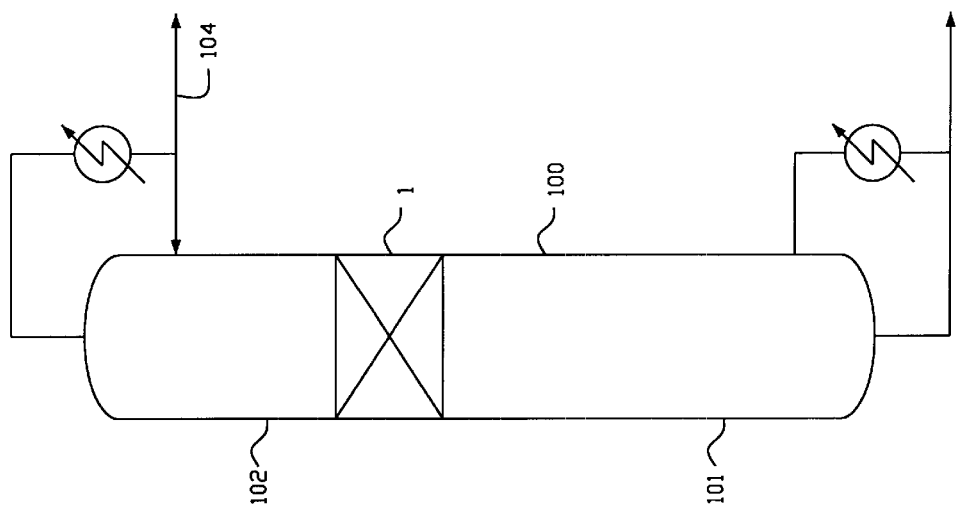
FIG. 1b shows a typical prior art reaction zone in rectifying section.
Figure 1A:
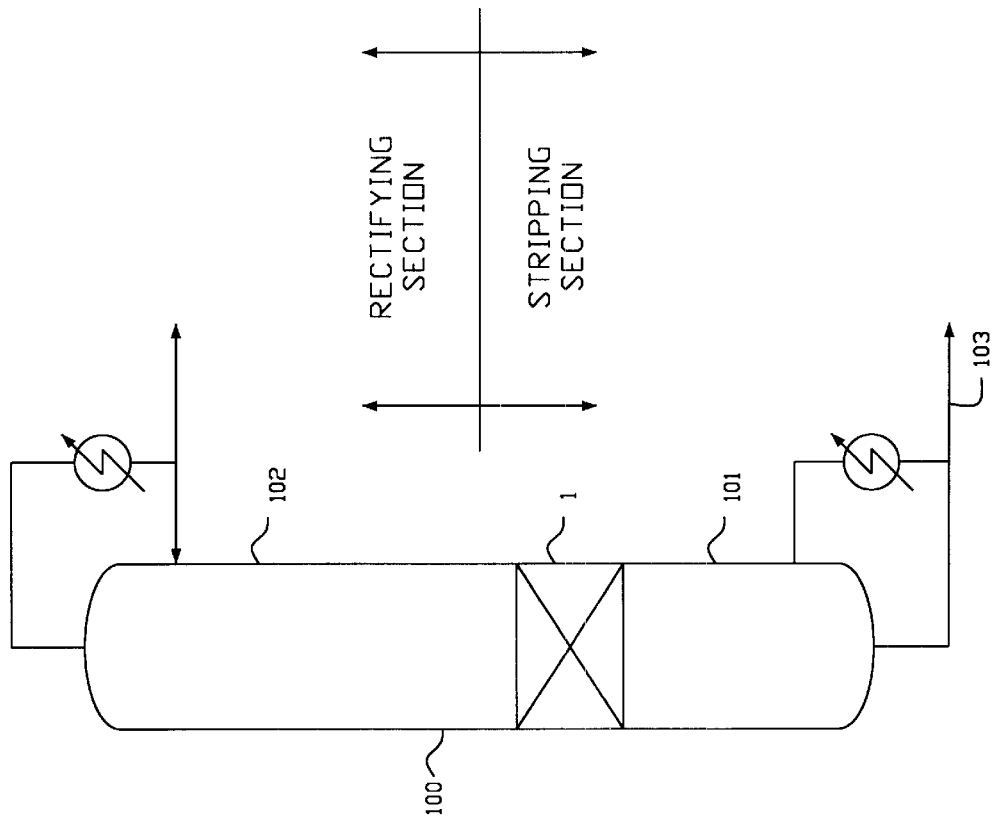
FIG. 1a shows a typical prior art reaction zone in stripping section.

All reactive distillations conform to configurations shown in either FIG. 1a or FIG. 1b.

FIG. 1a shows a reaction zone (1) within a distillation column (100) where product(s) of reaction exits at the bottom of the reaction zone (1), is being distilled downward through the stripping section (101) and recovered in the bottom stream (103).

FIG. 1b shows a reaction zone (1) within a distillation column (100) where product(s) of reaction exits at the top of the reaction zone (1), is being distilled upward through the rectifying section (102) and recovered in the distillate stream (104). Higher fractionation improves vapor liquid contact within the reaction zone, which directionally increases conversion and improves selectivity.

PRESENT INVENTION

Figure 2B:
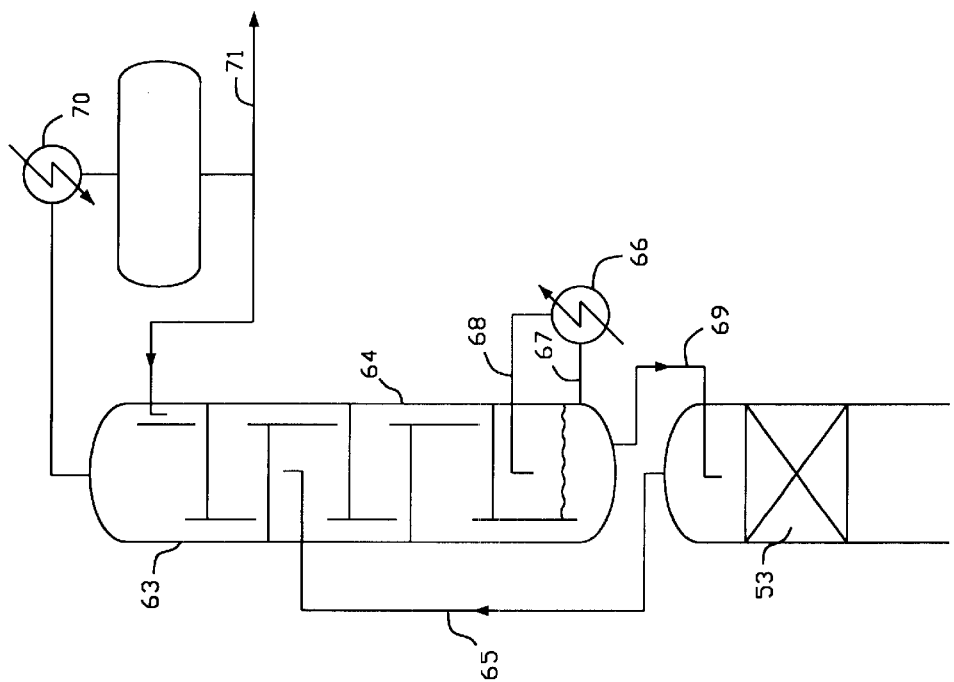
FIG. 2b shows the preferred embodiment of providing stripping in reactive distillation.
Figure 2A:
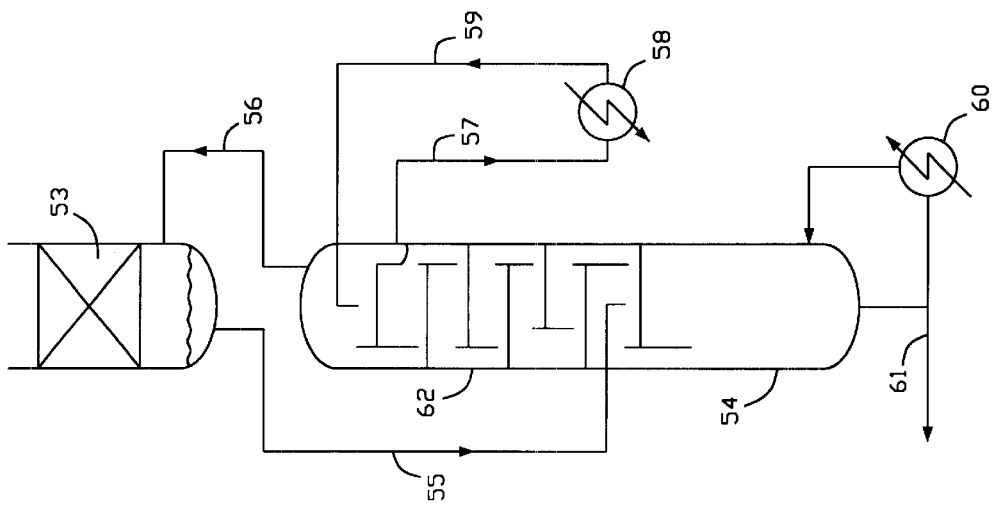
FIG. 2a shows the preferred embodiment of providing rectification in reactive distillation.
Figure 3B:
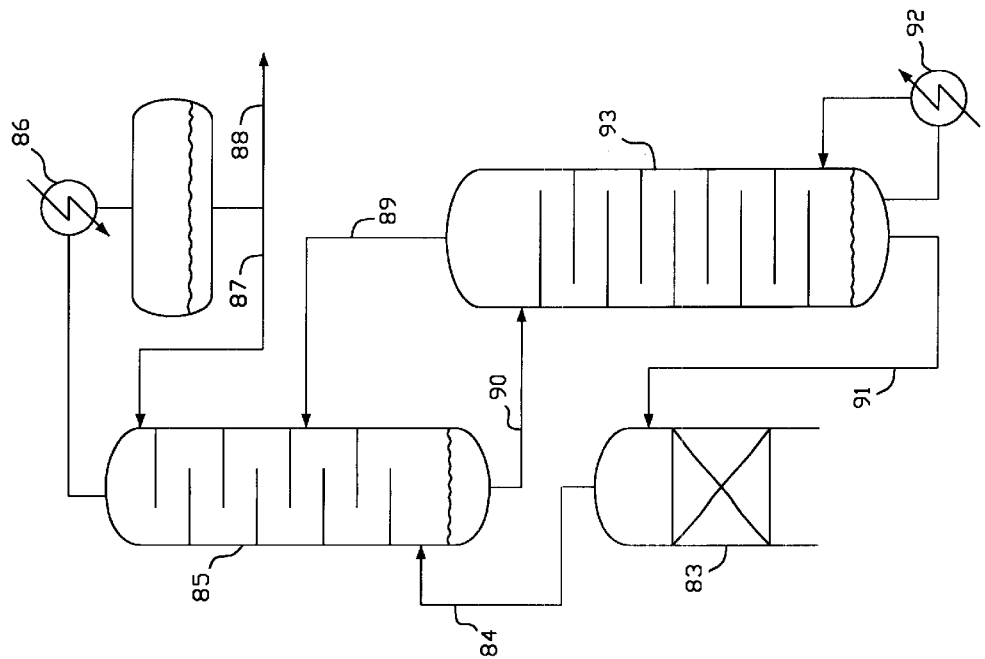
FIG. 3b shows an alternate arrangement of providing stripping in reactive distillation.
Figure 3A:
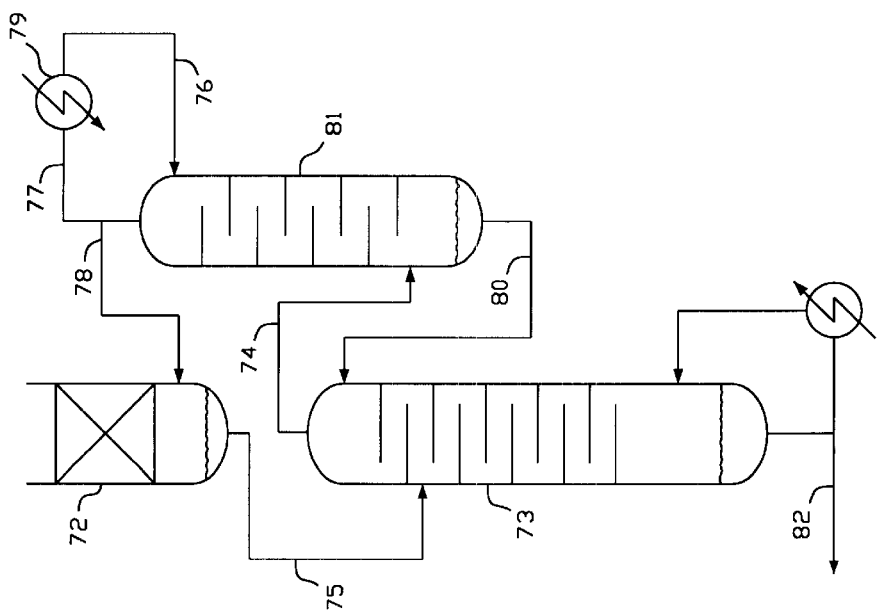
FIG. 3a shows an alternate arrangement of providing rectification in reactive distillation.

FIG. 2a shows a Rectified Reactive Distillation arrangement (RRD), with the rectification zone (62) above the stripping section (54) and below the reaction zone (53). Heat to the stripping section (54) is provided by reboiler (60). The product(s) of reaction, being heavier than the reactants, bypasses the rectification zone (62) via liquid stream (55) which is an external piece of piping communicating between the reaction zone (53) and the stripping section (54), distills downward through the stripping section (54), and is being recovered as bottom product (61). The vapor arising from the stripping section (54) below no doubt will vaporize some of this heavier product back up the column. However, the rectification zone (62) slows down re-entry rate by preventing large amounts of product re-entering the reaction zone (53). The vapor arising from the stripping section (54) below no doubt will vaporize some of this heavier product back up the column. However, the rectification zone (62) prevents large amounts of product front re-entering the reaction zone (53). Rectification allows the lighter reactants to re-enter the reaction zone (53) via vapor stream (56) with appreciably less reaction products. Cooling is provided by cooler (58), taking pump around inlet (57) and returning by pumparound outlet (59). This arrangement provides a direct method of separating products from reactants as soon as products and reactants leave the reaction zone. Such superior technical capability is not part of any conventional reactive distillation system. Alternatively, the rectification function can be provided by a separate column (81), trayed or packed, as shown in FIG. 3a. Here, the vapor (74) from the stripping section (73) below the reaction zone (72) is being rectified by condenser (79) having vapor inlet (77) and liquid outlet (76) before re-entering into the reaction zone (72) via vapor stream (78). Liquid stream (80) from the separate column (81) is returned to stripping section (73). Liquid stream (75) containing products and reactants from the reaction zone (72) enters stripping section (73). Those skilled in the art would be able to device many other arrangements bearing the same principles of a RRD arrangement described above. FIG. 2b shows a Stripped Reactive Distillation arrangement (SRD), with the stripping zone (64), below the rectifying section (63) and above the reaction zone (53). The cooling to the rectifying section (63) is provided by overhead condenser (70). The product(s) of reaction, being lighter than the reactants in this case, by-passes the stripping zone (64), via vapor stream (65) which is an external piece of piping communicating between the reaction zone (53) and the rectifying section (63), distills upward through rectifying section (63), and is recovered as distillate product (71). The liquid reflux generated by condenser (70) no doubt will condense some of this lighter product back down the column. However, the stripping zone (64) slows down re-entry rate of product into the reaction zone (53) via liquid line (69) by selectively stripping out the lighter components in the internal liquid traffic. Duty is provided by liquid (67) entering reboiler (66), generating vapor liquid return (68). This arrangement, again, provides a direct method of separating products from reactants as soon as products and reactants leave the reaction zone. Such superior technical capability is not part of any conventional reactive distillation system. Alternatively, the striping function can be provided by a separate column (93), trayed or packed, as shown in FIG. 3b. Here, the liquid (90) from the rectifying section (85) above the reaction zone (83) is stripped by reboiler (92) before re-entering into the reaction zone (83) via liquid stream (91). Those skilled in the art would be able to device many other arrangements bearing the same principles of a SRD arrangement described above.

Additional Ramifications

As taught in U.S. Pat. No. 5,476,978, a large benzene recycle of up to 100:1 benzene to ethylene ratio, is recommended to minimize formation of di-ethylbenzene (DEB), tri-ethyl benzene (TEB) and poly-ethylbenzene (PEB), all collectively known as polyalkylates Ethylene+benzene reversible reaction ethylbenzene (EB) Ethylene+ethylbenzene reversible reaction di-ethylbenzene (DEB) Ethylene+di-ethylbenzene reversible reaction tri-ethylbenzene (TEB)

Higher benzene recycle rate lowers ethyl benzene (EB) to benzene (BZ) ratio and therefore suppresses secondary reactions. However, even with the overwhelming ratio, significant PEB's are formed such that a transalkylator system is required. The transalkylator system converts PEB's back to EB by adding BZ.

TEB+BZ reversible reaction DEB+EB DEB+BZ reversible reaction 2 EB

Poor selectivity necessitates re-conversion of the PEB by-products back to the desirable product of EB. Had a RRD been incorporated into the design, the reaction zone can be made to optimize the quantity of EB returning from the stripping section below. This reduces the EB concentration all across the reaction zone, especially where the ethylene is being injected. Besides limiting undesirable secondary side reactions, lower EB concentration works very favorably towards shifting the equilibrium towards the product side, producing EB as the reaction product. EB, once made, would again be readily removed in an efficient and timely manner. The above two steps would repeat and feed on each other. In addition, a very shallow penetration of the reaction zone will result which again aids product removal as EB need not travel too far into the reaction zone before being removed. The overall effects would be reduced reactor catalyst volume requirement and reduced benzene recycle flow, and may even challenge the need for the transalkylator system. With the present invention, a truly efficient reactive distillation set-up is on hand. For an existing reactive distillation design using said prior art technology, the present invention can be a huge boost to profit margin. Besides, retrofitting costs could be paid off by a few weeks of using RRD. The following process simulation exercise using CHEMCAD software illustrates the impact of an RRD, retrofitted.

TABLE 1

| Stream | Temperature, deg F. | Flow rate, lb/hr | Location | BZ/EB, mass ratio | Duty, MMBTU/hr |
|---|---|---|---|---|---|
| Feed, F-1 | 440 | 10,000 | Tray 1 | 1.00 | |
| Distillate, D-1 | 440 | 5,240 | Tray 1 | 2.27 | |
| Bottom, B-1 | 474 | 4,760 | Tray 10 | 0.40 | 0.70 |
| Feed, F-2 | 440 | 10,000 | Tray 6 | 1.00 | −0.50 |
| Distillate, D-2 | 417 | 3,560 | Tray 1 | 7.85 | |
| Bottom, B-2 | 474 | 6,440 | Tray 10 | 0.40 | 1.00 |

The above simulation results, using SRK thermodynamic data, highlights the effect of a RRD unit within a 10 stage stripping section. The actual benefit will be more pronounced when the secondary effects, by iterative steps of substituting the calculated vapor's impact on entering liquid, are accounted for. It is for illustration purpose only. The base case, case 1, simulates a bubble point liquid stream, F-1, enters a conventional reactive distillation stripping section from the reaction zone above. F-1 has a 50/50 mix of BZ and EB. The bottom target is maintained at BZ/ELB ratio of 0.40 for further down stream product recovery. Reboiler duty is calculated by the program to be 0.70 MMBTU/hr, and D-1 contains 2.27 BZ/EB ratio. This ratio tells us that 30% of the vapor returning to the reactive distillation zone is actually EB!

The comparison case, case 2, starts with the same feed, but named F-2 for clarity. The bottom concentration is fixed at the same BZ/EB ratio of 0.40 and the reactor effluent flow is by-passed to 5 trays lower in the stripping section of the column. Please note that no additional staging is provided to show the attractiveness of retrofitting existing systems. Condenser duty is arbitrarily chosen at 0.5 MMBTU/hr and the program calculates the rest of the information. Notice the distillate, D-2, has gone up to 7.85 BZ/EB ratio. That is 3.5 times purer than case 1. Also, more bottom flows are achieved, accounting for a lower net rate of EB back into the reaction zone. The above is an illustration of the impact of RRD on reactive distillation.

As taught in U.S. Pat. No. 5,961,815, hydrogen is fed at a point below the heavy petroliferous stock boiling above 400 deg F. where a reactive distillation arrangement generates lighter, more desirable products. Substantial quantities of desirable products will re-enter the cracking zone, producing more light ends and reducing overall reaction selectivity. Had a SRD unit been incorporated into the design, it will limit the reaction zone from re-cracking the desirable products, such as gasoline cut, from the reflux stream. This will greatly improve overall cracking selectivity and make better use of hydrogen, which is usually in short supply. Those skilled in the art would have no problem simulating the effect of a SRD as demonstrated by the approach as in Table 1 above and come to a similar conclusion.

Highly effective product removal capability allows multiple reaction zones to perform different reaction tasks, reusing heat and properly separated products from reactants. For example, if ethylbenzene needs to be further converted, the reaction can be carried out in a two step process within the same reactive distillation column. RRD's can also be placed where rectification is required to enhance reaction selectivity.

Conclusion, Ramifications, and Scope of Invention

Thus the reader will see that this invention is truly the missing link in reactive distillation technology, providing a break in the composition profile continuum which otherwise cannot be achieved with conventional reactive distillation configurations. While my above description contain many specificities, these should not be construed as limitations on the scope of the invention, but rather as exemplification on one preferred embodiment thereof. Many other variations are possible. Examples can be found in coal tar distillation, biotechnology, pharmaceutical manufacturing processes and food and beverage applications and the list goes on.

I claim:

1. In a system for separating at least one reaction product heavier than reactants from a mixture comprising said at least one reaction product and said reactants, comprising a rectified reactive distillation column, said rectified reactive distillation column further comprises at least one reaction zone and at least one stripping section below said at least one reaction zone, said at least one stripping section separates the at least one reaction product from the at least one reaction zone to recover the at least one reaction product as bottom product from the rectified reactive distillation column, wherein the improvement comprises, rectification means between the at least one reaction zone and the at least one stripping section to slow down re-entry rate of the at least one reaction product into the at least one reaction zone while allowing the reactants to re-enter the at least one reaction zone to improve reaction selectivity, and, liquid communication means between the at least one reaction zone and the at least one stripping section, said liquid communication means functions as bypass around said rectification means.

2. The system according to claim 1, wherein the rectification means comprises at least one cooler.

3. The system according to claim 1, wherein the rectification means comprises at least one tray.

4. The system according to claim 1, wherein the rectification means comprises at least one separate column.

5. The system according to claim 1, wherein the rectification means comprises at least one vapor condenser.

6. The system according to claim 1, wherein the liquid communication means is a piece of pipe external to the rectified reactive distillation column.

7. The system according to claim 1, wherein the at least one reaction zone contains catalysts.

8. In a system for separating at least one reaction product lighter than reactants from a mixture comprising said at least one reaction product and said reactant, comprising a stripped reactive distillation column, said stripped reactive distillation column further comprises at least one reaction zone and at least one rectifying section above said at least one reaction zone, said at least one rectifying section separates the at least one reaction product from the at least one reaction zone to recover the at least one reaction product as distillate product from the stripped reactive distillation column, wherein the improvement comprises, stripping means between the at least one reaction zone and the at least one rectifying section to slow down re-entry rate of the at least one reaction product into the at least one reaction zone by selectively stripping out lighter components to improve reaction selectivity, and, vapor communication means between the at least one reaction zone and the at least one rectifying section, said vapor communication means functions as bypass around said stripping means.

9. The system according to claim 8, wherein the stripping means comprises at least one reboiler.

10. The system according to claim 8, wherein the stripping means comprises at least one tray.

11. The system according to claim 8, wherein the stripping means comprises at least one separate column.

12. The system according to claim 8, wherein the vapor communication means is a peace of pipe external to the stripped reactive distillation column.

13. The system according to claim 8, wherein the at least one reaction zone contains catalysts.

\* \* \* \* \*